Figure 1:
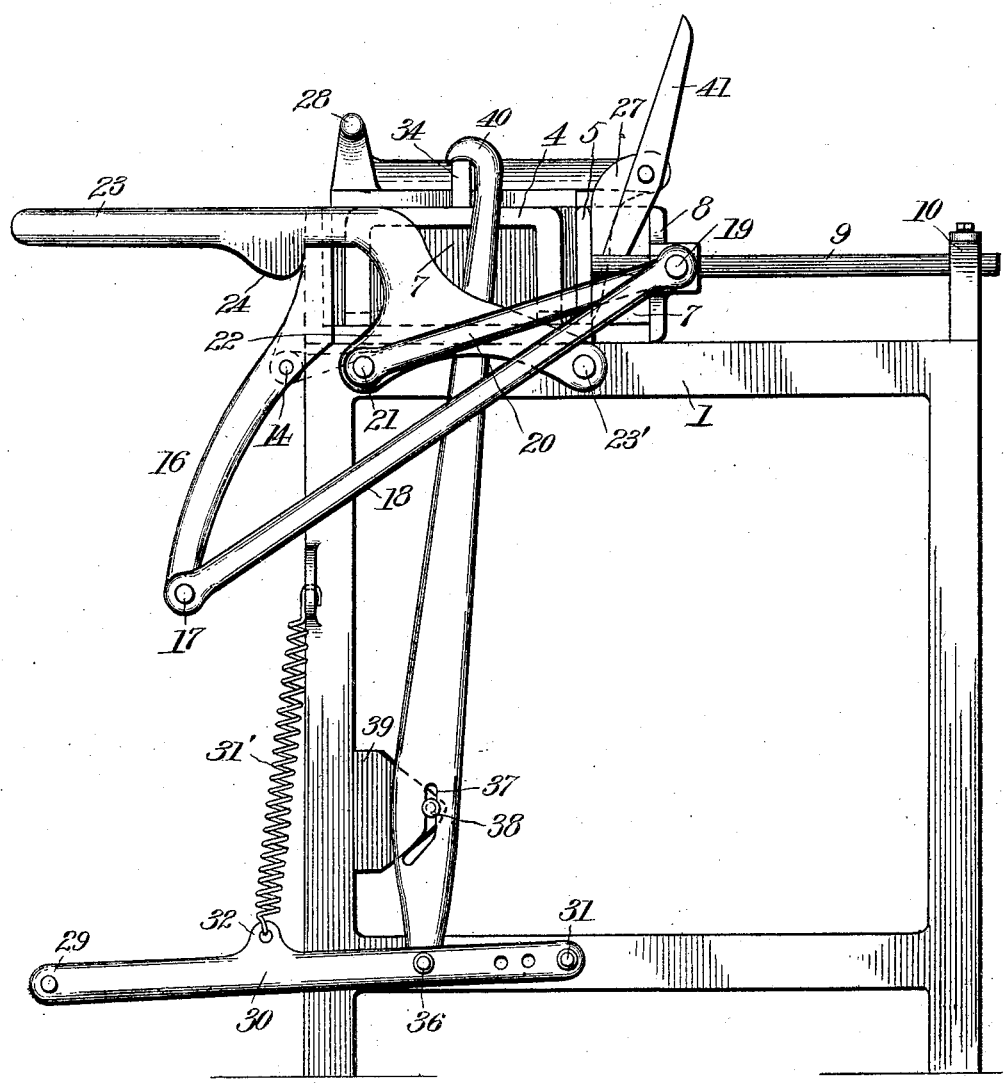

No. 890,039. PATENTED JUNE 9, 1908.
J. S. FISH.
MACHINE FOR MOLDING CONCRETE OR CEMENT BRICK.
APPLICATION FILED APR. 25, 1907.

4 SHEETS—SHEET 1.

Witnesses
C. N. Walker.
George Oltsch

Inventor
John S. Fish.
By
Attorney

No. 890,039. PATENTED JUNE 9, 1908.
J. S. FISH.
MACHINE FOR MOLDING CONCRETE OR CEMENT BRICK.
APPLICATION FILED APR. 25, 1907.
4 SHEETS—SHEET 2.
Fig. 2.
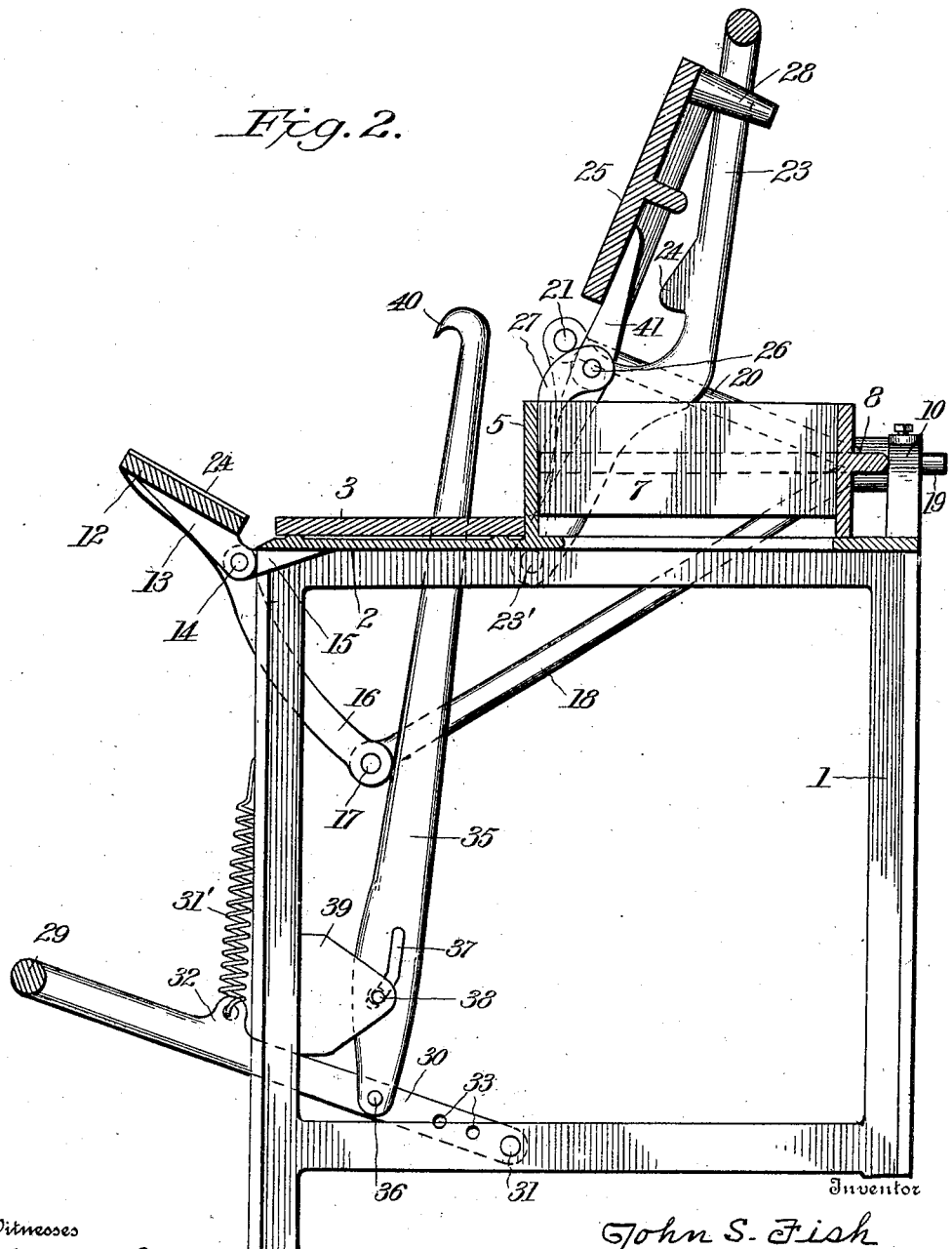
Witnesses
C. N. Walker,
George Oltsch
Inventor
John S. Fish
By 
Attorney No. 890,039. PATENTED JUNE 9, 1908.
J. S. FISH.
MACHINE FOR MOLDING CONCRETE OR CEMENT BRICK.
APPLICATION FILED APR. 25, 1907.
4 SHEETS—SHEET 3.
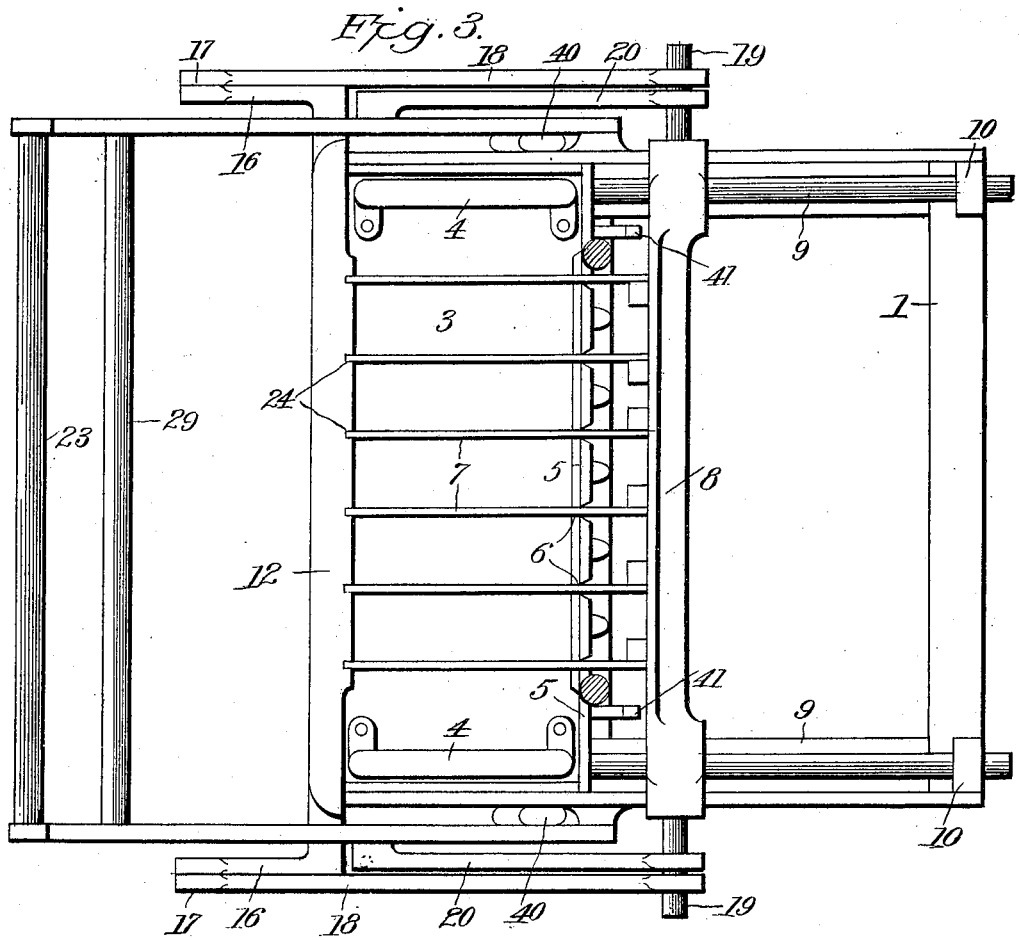
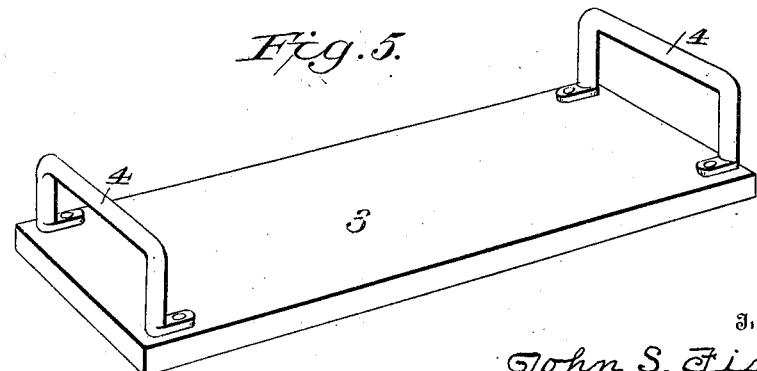
Witnesses
C. H. Walker.
George Oltsch.
Inventor
John S. Fish
By 
Attorney No. 890,039. PATENTED JUNE 9, 1908.
J. S. FISH.
MACHINE FOR MOLDING CONCRETE OR CEMENT BRICK.
APPLICATION FILED APR. 25, 1907.

4 SHEETS—SHEET 4.

Witnesses.
C. H. Walker,
George Altsch

Inventor.
John S. Fish
Attorney.

UNITED STATES PATENT OFFICE.

JOHN S. FISH, OF SOUTH BEND, INDIANA.

MACHINE FOR MOLDING CONCRETE OR CEMENT BRICK.

No. 890,039.  Specification of Letters Patent.  Patented June 9, 1908.

Application filed April 25, 1907. Serial No. 370,256.

*To all whom it may concern:*

Be it known that I, JOHN S. FISH, a citizen of the United States, residing at South Bend, in the county of St. Joseph and State of Indiana, have invented certain new and useful Improvements in Machines for Molding Concrete or Cement Brick, of which the following is a specification.

This invention relates to a machine for molding concrete or cement bricks.

One object of the invention is to provide a machine of the nature stated embodying such characteristics that a series of bricks may be formed simultaneously and removed together from the machine in such manner as to prevent chipping or breaking of the bricks in their removal from the machine.

Another object of the invention resides in the provision of a machine constructed and arranged whereby certain parts of its mold may be simultaneously shifted toward and away from one another with a top member for the mold constructed and arranged to swing thereover and be pulled downwardly tightly upon the mold to insure an efficient compression of the material within the mold.

A still further object of the invention resides in the construction of a machine provided with a mold adapted to be subdivided for the purpose of forming a series of bricks at one operation and to so construct the mold of the machine that the means for subdividing the mold may be shifted into and out of operation simultaneously with a shifting of one of the side members of the mold.

With the above and other objects in view, the present invention consists in the combination and arrangement of parts hereinafter more fully described, illustrated in the accompanying drawings and particularly pointed out in the appended claims, it being understood that changes may be made in the form, size, proportion, and minor details without departing from the spirit or sacrificing any of the advantages thereof.

Figure 4:
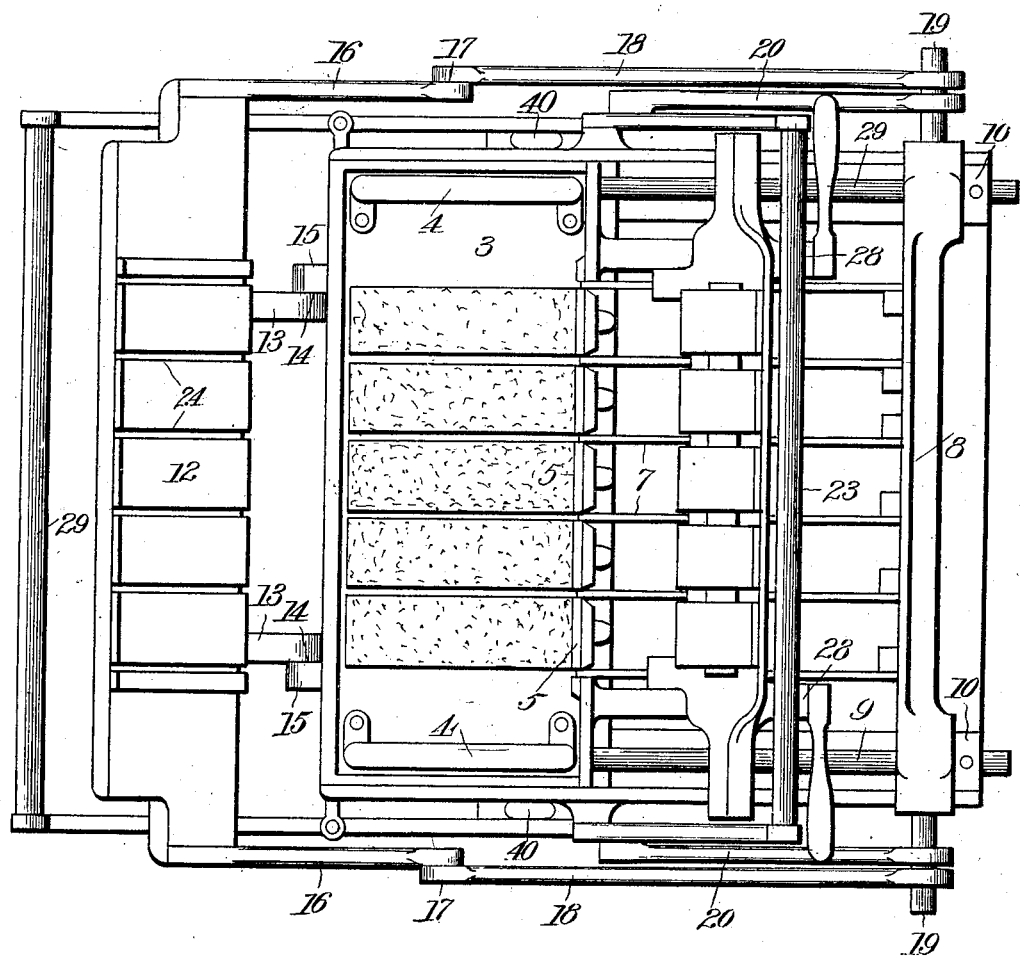

In the drawings:—Figure 1 is a side elevation of my invention illustrating the parts assembled in the formation of one or more bricks. Fig. 2 is a vertical sectional view of the mold illustrating the parts disassembled and ready for assembling to form one or more bricks. Fig. 3 is a top plan view of the parts illustrated in Fig. 1 with the top member removed. Fig. 4 is a top plan view of the parts illustrated in Fig. 2. Fig. 5 is a detail perspective view of the palette board.

Referring now more particularly to the accompanying drawings, the reference character 1 indicates a frame including a bed plate portion 2 for the support of the removable palette board 3 which is designed to be disposed upon the bed plate portion 2 of the frame within the mold, so that the finished bricks or blocks may be removed with the palette board from the mold without chipping or breaking the blocks, the palette board having the handles 4 at each end to facilitate handling thereof.

The reference character 5 indicates a fixed side of the mold provided with a series of slits 6 through which the partition members 7 of the mold are adapted to be projected. These partition members 7 are fixedly secured to the header 8 slidably mounted upon the guide rails 9 which are mounted at their rear ends in the posts 10 and secured at their forward ends to the fixed side member 5.

The ends of the mold proper are open and the outer or swinging side member 12 of the mold has lugs 13 upon its outer face whereby it may be pivoted at 14 to the lugs 15 of the frame. Secured at each pivot 14 is an arm connection 16, each arm having pivotal connection at 17 with a link 18, which latter, each has pivotal connection with the corresponding trunnion 19 of the header 8. Pivotally secured to each trunnion 19 is another link 20 pivotally connected at 21 to the lug portion 22 of the operating handle 23, whereby a downward movement of the operating handle 23 upon its pivots 23' from the position shown in Fig. 2 to the position shown in Fig. 1, will cause a forward movement of the header 8 upon the guide rails 9 simultaneously with an inward movement of the side member 12. As the side member 12 moves upwardly or inwardly simultaneously with the forward movement of the partition members 7, the former arrives in operating position at the proper time to present its grooves 24 for the reception of the forward or free ends of the partition members 7. To insure positive locking of the two movable side members in proper position, I provide the handle 23 with the lugs 24 adapted to present their inner faces against the outer face of the pivoted side member 12, as clearly shown in Fig. 1.

When the parts have been assembled as described immediately above, the mold is ready to receive the material to compress into bricks or blocks. The material is then placed within the mold and the top member 25 is swung upon its pivots 26 mounted in the ears 27 secured to the back of the side member 5 by grasping the handle members 28. A treadle 29 is provided which has its legs 30 pivoted to the frame 1 at 31 and which is held normally in its upward position through the instrumentality of oppositely disposed springs 31' secured to the lugs 32 of the legs of the treadle and to the frame, as clearly shown in Figs. 1 and 2. The legs 30 of the treadle each has a series of perforations 33 whereby the leverage action of the treadle may be adjusted. The top facing member 25 is provided with a lug 34 at each end formed for the purpose of coöperating with the locking levers 35 pivoted at their lower ends to the leg portions 30 of the treadle, as indicated at 36. Each locking lever 35 is provided with a curved slot 37 each adapted to work upon a fixed pin 38 mounted in the lugs 39 of the frame. Thus when the top plate 25 is thrown downwardly over the mold, the locking levers 35 present their hook portions 40 over the aforesaid projections 34 to pull the top member 25 down tightly upon the mold to lock the top member and to compress the material in the mold, as clearly shown in Fig. 1.

When it is desired to remove the blocks or bricks from the mold, the foot is removed from the treadle 30 when the springs 31' will cause the treadle to move upwardly and the hook portions 40 of the locking levers 35 disengage from the projections 34 of the top of the mold. During this movement neither the side 12 nor the partition members 7 of the mold are moved from their normal operating position. The operating handle 23 is then grasped and moved upwardly and in its upward movement engages the handle portions 28 of the top member 25 of the mold to lift the latter upon its pivots 26 from over the mold, such operation of the operating handle 23 lifting the top member and also effecting a dropping of the side member 12 of the mold and the withdrawal of the partition members 7, as shown in Figs. 2 and 4. The top member 25 is limited in its backward swinging movement by engagement with the stops 41.

From the foregoing it will be seen that I provide a comparatively simple and inexpensive molding machine which, in addition to its comparative simplicity and inexpensiveness, embodies a positive operation and durability, the leverage connections being so proportioned as to effect these characteristics and to coöperate with means whereby the various movable parts of the mold may be firmly locked against accidental displacement during the compression of the material in the mold. Obviously the slits of the fixed side member may be spaced a greater or less distance than shown, or some may be spaced a greater or less distance from one slit than others, whereby blocks of different sizes may be formed at the same time.

What is claimed is:

1. A machine for molding concrete or cement bricks comprising a frame, a mold mounted upon the frame including a fixed side, a swinging side member and a swinging top member, an operating handle, and means for simultaneously swinging the swinging side and top members out of operative position.

2. A machine for molding concrete or cement bricks comprising a frame, a mold mounted upon the frame including a fixed side, the fixed side having slits, a swinging side member and a swinging top member for the mold, a header slidably mounted upon the frame in the rear of the mold and provided with partition members adapted to be projected into and out of the mold through the slits of said fixed side member, an operating handle, and connections between the swinging side member, the header, and the operating handle to shift the swinging side member and header toward and away from each other.

3. A machine for molding concrete or cement bricks comprising a frame, a mold mounted upon the frame including a fixed side, the fixed side having slits, a swinging side member, a swinging top member for the mold, a header slidably mounted upon the frame in the rear of the mold and provided with partition members adapted to be projected into and out of the mold through the slits of said fixed side member, an operating handle, connections between the swinging side member, the header, and the operating handle to shift the swinging side member, and header toward and away from each other, a treadle, and locking and compressing levers having connection with the treadle for engagement with the top member to pull the latter down tightly upon the mold to compress the material therein.

4. A machine for molding concrete or cement bricks comprising a frame, a mold mounted upon the frame including a fixed side, the fixed side having slits, a swinging side member, a fixed top member for the mold, a header slidably mounted upon the frame in the rear of the mold and provided with partition members adapted to be projected into and out of the mold through the slits of said fixed side member, an operating handle, connections between the swinging side member, the header, and the operating handle to shift the swinging side member and header toward and away from each other, and means constructed and arranged to exert a downward pull upon the top member to lock the same upon the mold and compress the material therein.

5. A machine for molding concrete or cement bricks comprising a frame, a mold mounted upon the frame including a fixed side having slits, a swinging side member, a swinging top member for the mold, a header slidably mounted upon the frame in the rear of the mold and provided with partition members adapted to be projected into and out of the mold through the slits of said fixed side members, means having connection with the swinging side member, the header, and the operating handle to shift the swinging side member and header toward and away from each other, a spring actuated treadle, and locking levers having connection with the treadle upon the opposite side of the machine for engagement with opposite ends of the top member to exert a downward pull upon the latter to lock it and compress the material within the mold.

6. A machine for molding concrete or cement bricks comprising a frame, a mold mounted upon the frame including a fixed side, the side member having slits throughout its length, a swinging side member for coöperation with the aforesaid side member, a swinging top member, a header mounted for sliding movement in the rear of the mold and provided with partition members for projection into and out of the mold through the slits of said member, an operating handle, connections between the swinging side member, the header and the operating handle, whereby the swinging side member and header may be shifted toward and away from each other simultaneously, the operating handle having lugs for engagement with the outer face of the swinging side member when the latter is shifted to operative position to lock it against displacement, and means mounted upon the frame for coöperation with the top member to lock it in position and compress the material within the mold.

7. A machine for molding concrete or cement bricks comprising a frame, a mold mounted upon the frame, including a fixed side having a series of slits throughout its length, a swinging side member, a swinging top member, a slidable head provided with a series of partition members for projection into and out of the mold through said slits, an operating handle pivotally mounted upon the frame, link connections between the swinging side member, the header and the operating handle, whereby swinging movement of the operating handle will effect a movement of the swinging side member and header toward and away from each other, the top member having handle projections adapted to be engaged by said operating handle when the latter is swung upwardly upon its pivot to move the top member from over the mold.

8. A machine for molding concrete or cement bricks comprising a frame, a mold mounted upon the frame, the mold including a fixed side, the fixed side having a series of slits throughout its length, a swinging side member, a swinging top member, a slidable head provided with a series of partition members for projection into and out of the mold through said slits, an operating handle pivotally mounted upon the frame, link connections between the swinging side member, the header, and the operating handle, whereby swinging movement of the operating handle will effect a movement of the swinging side member and header toward and away from each other, the top member having handle projections adapted to be engaged by said operating handle when the latter is swung upwardly upon its pivot to move the top member from over the mold, and stops to limit the backward swinging movement of the top member.

9. A machine for molding concrete or cement bricks comprising a frame, a mold mounted upon the frame including a fixed side, the side member having a series of slits throughout its length, a swinging side member for coöperation with the fixed side member, a swinging top member, a header mounted to slide upon the frame and provided with a series of partition members adapted to be projected into and out of the mold through the slits of said fixed side member, the swinging side member having a series of grooves throughout its length to receive the free ends of the partition members when the swinging side member is thrown to vertical position, an operating handle link connections between the swinging side member, the header and the operating handle whereby the swinging side member and header may be shifted toward and away from each other simultaneously, the top member having projections adapted to be engaged by the operating handle when the latter is swung upwardly to effect a swinging of the top member during the simultaneous shifting of the swinging side member and the header away from each other.

10. A machine for molding concrete or cement bricks comprising a frame, a mold mounted upon the frame including a fixed side member, the side member having a series of slits throughout its length, a swinging side member coöperating with the fixed side member, a header slidably mounted upon the frame and provided with partition members adapted to be projected into and out of the mold through said slits, a top member, an operating handle, connections between the swinging side member, the header and the operating handle, whereby the swinging member and the header may be moved toward and away from each other, the swinging side member having a series of grooves in its inner face to receive the free ends of the partition members when the swinging side member is disposed in coöperative position with the fixed side member.

11. A machine for molding concrete or cement bricks comprising a frame, a mold mounted upon the frame including a fixed side member, the side member having a series of slits throughout its length, a swinging side member coöperating with the adjacent ends and fixed side member, a header slidably mounted upon the frame and provided with partition members adapted to be projected into and out of the mold through said slits, a top member, an operating handle, connections between the swinging member, the header and the operating handle, whereby the swinging member and the header may be moved toward and away from each other, the swinging side member having a series of grooves in its inner face to receive the free ends of the partition members when the swinging side member is disposed in coöperating position with the ends and fixed side member, a treadle, and a connection between the treadle and top member to lock the latter upon the mold and compress the material within the latter.

12. A machine for molding concrete or cement bricks comprising a frame, a mold mounted upon the frame including a fixed side member, a swinging side member coöperating with the aforesaid side member, a swinging top member, and an operating handle constructed and arranged to swing the swinging side member out of operative position and to lift the top member from over the mold.

13. A machine for molding concrete or cement bricks comprising a frame, a mold mounted upon the frame including a fixed side member, the latter including a series of slits throughout its length, a swinging side member for coöperation with the aforesaid side member, a swinging top member provided with a projection at each end, a slidable header provided with a series of partition members adapted to be projected into and out of the mold through said slits, an operating handle pivotally mounted upon the frame, connections between the swinging side member, the header and the operating handle whereby the swinging side member and the header may be moved toward and away from each other during movement of the operating handle upon its pivot, a treadle, and oppositely disposed levers adapted to engage the projections at the ends of the top member when the latter is swung over the mold to lock it in position for compression of the material within the mold.

14. A machine for molding concrete or cement bricks comprising a frame, a mold mounted upon the frame including a fixed side member, having a series of slits throughout its length, a swinging side member, a top member, a header provided with a series of partition members adapted to be projected into and out of the mold through said slits, an operating handle pivotally mounted upon the frame, connections between the swinging side member, the header and the operating handle whereby the swinging side member and the header may be moved toward and away from each other during movement of the operating handle upon its pivot, a treadle, and oppositely disposed levers adapted to engage the projections at the ends of the top member when the latter is swung over the mold to lock it in position to compress the material within the mold, the operating handle having projections for engagement with the outer face of the swinging side member when the latter is in operative position to lock it against accidental displacement.

15. A machine for molding concrete or cement bricks comprising a frame, a mold mounted upon the frame including a fixed side member, having a series of slits throughout its length, a swinging side member, a top member provided with a projection at each end, a slidable header provided with a series of partition members adapted to be projected into and out of the mold through said slits, an operating handle pivotally mounted upon the frame, connnections between the swinging side member, the header and the operating handle whereby the swinging side member and the header may be moved toward and away from each other during movement of the operating handle upon its pivot, a treadle, and oppositely disposed levers adapted to engage the projections at the ends of the top member when the latter is swung over the mold to lock it in position to compress the material within the mold, the top member having handles adapted to be engaged by the aforesaid operating handle whereby the top member may be shifted from over the mold when the operating handle is raised upon its pivot to effect a movement of the header and swinging side member away from each other.

16. A machine for molding concrete or cement bricks, comprising a frame, a mold mounted upon the frame including a fixed side member, the latter including a series of slits throughout its length, a swinging side member for coöperation with the aforesaid side member, a swinging top member provided with a projection at each end, a slidable header provided with a series of partition members adapted to be projected into and out of the mold through said slits, an operating handle pivotally mounted upon the frame, connections between the swinging side member, the header and the operating handle whereby the swinging side member and the header may be moved toward and away from each other during movement of the operating handle upon its pivot, a treadle, and oppositely disposed levers adapted to engage the projections at the ends of the top member when the latter is swung over the mold to lock it in position to compress the material within the mold, the operating handle having projections for engagement with the outer face of the swinging side member when the latter is in operative position to lock it against accidental displacement, the top member having handles adapted to be engaged by the aforesaid operating handle whereby the top member may be shifted from over the mold when the operating handle is raised upon its pivot to effect a movement of the header and swinging side member away from each other.

17. A machine for molding concrete or cement bricks comprising a frame, a mold mounted upon the frame including a swinging side member, a swinging top, a pallet board arranged for disposition within the mold, partition members slidable over said pallet board and a single means for swinging the swinging side member outwardly and the top member upwardly to permit of a removal of the pallet board.

18. A machine for molding concrete or cement bricks comprising a frame, an open ended mold mounted upon the frame, a removable pallet board disposed within the mold, a fixed side facing member having slits throughout its length, a swinging side member, a swinging top member, a slidable header having partition members secured thereto and adapted to be projected into and out of the mold through said slits, means for simultaneously moving the swinging side member and the header toward and away from each other, and means whereby the top member may be swung toward and away from the mold as the single side member is thrown out of operative position.

19. A machine for molding concrete or cement bricks comprising a frame, an open-ended mold mounted upon the frame, a fixed side member having slits throughout its length, a swinging side member, a swinging top member, a slidable header having partition members adapted to be projected into and out of the mold through said slits, means for simultaneously moving the swinging side member and the header toward and away from each other, and means whereby the top member may be swung toward and away from the mold at the time of throwing the single side member out of operative position, the end partition members of the header forming the ends of the mold when the latter is assembled.

20. A machine of the character described comprising a mold including a swinging side member, a swinging top member, slidable partition members, and a single means for swinging the side and top members and for moving the partition members simultaneously out of operative position, said means carrying elements to lock the swinging side member in operative position.

21. A machine of the character described comprising a mold including a swinging side member, a swinging top member, a slidable partition member, and a single means for swinging the side and top members and for moving said partition member simultaneously out of operative position.

22. A machine of the character described comprising a mold including a swinging side member, a swinging top member, a slidable partition member, and a single means for swinging the side and top members and for moving said partition member simultaneously out of operative position and also for locking the swinging side member in operative position.

In testimony whereof I have signed my name to this specification in the presence of two subscribing witnesses.

JOHN S. FISH.

Witnesses:
GEORGE OLTSCH,
ALONZO ROBISON.